United States Patent [19]
Tachita et al.

[11] Patent Number: 5,600,328
[45] Date of Patent: Feb. 4, 1997

[54] DEMODULATOR CIRCUIT IN GLOBAL POSITIONING SYSTEM RECEIVER

[75] Inventors: Ryobun Tachita, Kawasaki; Akihisa Kawasaki, Sagamihara; Izumi Satoh, Matsumoto, all of Japan

[73] Assignee: Matsushita Electric Industrial Co., Ltd., Osaka, Japan

[21] Appl. No.: 492,968

[22] Filed: Jun. 21, 1995

[51] Int. Cl.$^6$ ................................. G01S 5/02
[52] U.S. Cl. .................. 342/357; 342/352; 375/200
[58] Field of Search ................... 342/357, 352; 375/200

[56] References Cited

U.S. PATENT DOCUMENTS

| | | |
|---|---|---|
| 4,457,006 | 6/1984 | Maine et al. . |
| 5,029,181 | 7/1991 | Endo et al. ............................ 375/200 |
| 5,031,191 | 7/1991 | Hiramatsu et al. .................... 375/200 |
| 5,280,538 | 1/1994 | Kataoka et al. ....................... 375/200 |
| 5,436,935 | 7/1995 | Bernhard et al. ..................... 375/367 |
| 5,486,834 | 1/1996 | Lennen .................................. 342/357 |

FOREIGN PATENT DOCUMENTS

| | | |
|---|---|---|
| 58-88676 | 5/1983 | Japan . |
| 2-103487 | 4/1990 | Japan . |
| 5-52931 | 3/1993 | Japan . |

*Primary Examiner*—Thomas H. Tarcza
*Assistant Examiner*—Dao L. Phan
*Attorney, Agent, or Firm*—Lowe, Price, LeBlanc & Becker

[57] ABSTRACT

A demodulator circuit in which N satellite signals included in N radio waves transferred from N satellites are detected by removing noise codes and carrier waves modulated by the satellite signals and the noise codes from the radio waves to measure a position of a movable body is disclosed. N pseudo-noise code signals indicating pseudo-noise codes corresponding to noise codes peculiar to the satellites are generated in N pseudo-noise code generators, and N correlation signals indicating degrees of correlation between the radio waves and the N pseudo-noise code signals are generated in N correlation units. Therefore, the noise codes are removed from the radio waves. Also, M carrier oscillating signals corresponding to each of the carrier waves of the radio waves are generated in (N×M) carrier local oscillators, and the N correlation signals are frequency-converted into (N×M) base signals with the (N×M) carrier oscillating signals in (N×M) orthogonal frequency converters. Therefore, the carrier waves are removed from the radio waves. Thereafter, the satellite signals of the satellites are detected by time-integrating N base signals relating to N carrier oscillating signals of which frequencies agree with those of the carrier waves.

12 Claims, 6 Drawing Sheets

DEMODULATOR CIRCUIT IN GLOBAL POSITIONING SYSTEM RECEIVER

BACKGROUND OF THE INVENTION

1. Field of the Invention

The present invention relates generally to a demodulator circuit in a global positioning system receiver used in a satellite navigation field, and more particularly to a demodulator circuit in which a position of an artificial satellite is measured by using a radio wave transferred from the satellite.

2. Description of the Prior Art

Recently, a global positioning system receiver in which a radio wave transferred from a position-measuring satellite is received to measure an absolute position of the satellite has been broadly utilized as a navigation apparatus in a mobile, ship or aircraft. For example, a conventional global positioning system receiver is disclosed in Published Unexamined Japanese Patent Application No. 103487 of 1990 (H2-103487).

2.1. PREVIOUSLY PROPOSED ART

FIG. 1 is a block diagram of a conventional demodulator circuit of a global system receiver in which 32 types of signals in 8 channels (or eight satellites) are demodulated.

As shown in FIG. 1, a conventional demodulator circuit 11 is composed of an antenna 12 for receiving eight types of radio waves transferred from eight position-measuring satellites (NAVSTAR) 13, an amplifier 14 for amplifying the radio waves in a group to form an amplified signal, a first local oscillator 15 for generating a first oscillating signal, a mixing unit 16 for mixing the amplified signal with the first oscillating signal to convert in frequency the amplified signal into an intermediate-frequency signal, an intermediate frequency amplifier 17 for amplifying the intermediate-frequency signal, a second local oscillator 18 for generating an in-phase oscillating signal and an orthogonal oscillating signal orthogonal to each other, a first orthogonal frequency converter 19a for orthogonal-converting the amplified intermediate-frequency signal with the in-phase oscillating signal to form an in-phase signal Si, a second orthogonal frequency converter 19b for orthogonal-converting the amplified intermediate-frequency signal with the orthogonal oscillating signal to form an orthogonal signal Sq, thirty-two pseudo-noise code generators 20 for respectively generating one of four phase-types of pseudo-noise code signals corresponding to a noise code peculiar to one of the eight position-measuring satellites 13, sixty-four correlation units 21 for generating thirty-two in-phase correlation signals indicating degrees of correlation between the in-phase signal Si and the thirty-two pseudo-noise code signals and thirty-two orthogonal correlation signals indicating degrees of correlation between the orthogonal signal Sq and the thirty-two pseudo-noise code signals, sixty-four filters 22 for filtering the thirty-two in-phase correlation signals and the thirty-two orthogonal correlation signals, eight carrier local oscillators 23 for respectively generating an in-phase carrier oscillating signal and an orthogonal carrier oscillating signal orthogonal to each other corresponding to one of eight carrier waves of the radio waves transferred from the position-measuring satellites 13, thirty-two third orthogonal frequency converters 24 for receiving thirty-two sets of correlation signals respectively composed of an in-phase correlation signal and an orthogonal correlation signal filtered in the filters 22 and respectively converting in frequency one of the thirty-two sets of correlation signals into an in-phase base signal and an orthogonal base signal orthogonal to each other according to one set of in-phase carrier oscillating signal and orthogonal oscillating signal generated in one of the carrier local oscillators 23, sixty-four integrating units 25 for time-integrating the thirty-two in-phase base signals and the thirty-two orthogonal base signals each time the pseudo-noise code signals are generated in the pseudo-noise code generators 20 to form sixty-four integrating signals indicating integrated values, a control unit 26 for controlling code phases of the pseudo-noise code signals generated in the pseudo-noise code generators 20 and frequencies of the carrier oscillating signals generated in the carrier local oscillators 23 according to the integrating signals to track the noise codes and the carrier waves peculiar to the eight position-measuring satellites 13, a measured position calculating unit 27 for calculating a position of the antenna 12 from eight pieces of orbital information and eight pieces of time information of the position-measuring satellites 13 included in the integrating signals and an outputting unit 28 for outputting the position of the antenna 12.

In the above configuration, an operation performed in the conventional demodulator circuit 11 is described.

A noise code and satellite signals indicating a piece of orbital information and a piece of time information are output with a carrier wave from each position-measuring satellite 13 as a radio wave. That is the carrier wave is modulated by the noise code peculiar to each of the satellites 13 and the satellite signal, and an energy of the radio wave is diffused.

When the radio waves of a plurality of position-measuring satellite 13 are received in the antenna 12 of a movable body such as a mobile, ship or aircraft, the radio waves are Doppler-shifted. The radio waves received in the antenna 12 are amplified in the amplifier 14 in a group to form an amplified signal. Thereafter, the amplified signal is mixed in the mixing unit 16 with the first oscillating signal generated in the first local oscillator 15 to convert in frequency the amplified signal into an intermediate-frequency signal. Thereafter, the intermediate-frequency signal is amplified in the intermediate frequency amplifier 17. Thereafter, the amplified intermediate-frequency signal is orthogonal-converted with the in-phase oscillating signal in the first orthogonal frequency converter 19a to form an in-phase signal Si. Also, the amplified intermediate-frequency signal is orthogonal-converted with the orthogonal oscillating signal in the second orthogonal frequency converter 19b to form an orthogonal signal Sq.

In the pseudo-noise code generators 20, four phase-types of pseudo-noise code signals corresponding to a noise code peculiar to one position-measuring satellite 18 are generated for each of the position-measuring satellites 13. Therefore, thirty-two pseudo-noise code signals are generated in the thirty-two pseudo-noise code generators 20 in one-to-one correspondence. Code phases of the pseudo-noise code signals corresponding to a noise code are close to those of the corresponding noise code under the control of the control unit 26. Thereafter, thirty-two in-phase correlation signals indicating degrees of correlation between the in-phase signal Si and the thirty-two pseudo-noise code signals are generated in thirty-two correlation units 21. Also, thirty-two orthogonal correlation signals indicating degrees of correlation between the orthogonal signal Sq and the thirty-two pseudo-noise code signals are generated in the other thirty-two correlation units 21. In this case, the stronger a degree of correlation, the lower a frequency of an in-phase or orthogonal correlation signal relating to the correlation.

Also, because the pseudo-noise code signals generated in the thirty-two pseudo-noise code generators 20 correspond to the noise codes of the position-measuring satellites 18, the noise codes included in the in-phase signal Si and the orthogonal signal Sq are removed in the correlation units 21. Thereafter, the orthogonal correlation signals and the in-phase correlation signals are filtered in the filters 22 in one-to-one correspondence to pass orthogonal correlation signals and in-phase correlation signals respectively having a low frequency. That is, an intensity of an in-phase or orthogonal correlation signal indicating a weak correlation is reduced in the filter 22, and an intensity of an in-phase or orthogonal correlation signal indicating a strong correlation are maintained at a high value in the filter 22.

In each of the carrier local oscillators 23, an in-phase carrier oscillating signal and an orthogonal carrier oscillating signal which are orthogonal to each other and correspond to one of eight carrier waves of the radio waves transferred from the position-measuring satellites 13 are generated. That is, a frequency of the in-phase and orthogonal carrier oscillating signals is close to that of a corresponding carrier wave under the control of the control unit 26. Thereafter, the thirty-two sets of correlation signals respectively composed of an in-phase correlation signal and an orthogonal correlation signal filtered in the filters 22 are input to the third orthogonal frequency converters 24 in one-to-one correspondence. Also, a set of the in-phase carrier oscillating signal and the orthogonal carrier oscillating signal corresponding to a position-measuring satellite 13 is transferred from each carrier local oscillator 23 to four third orthogonal frequency converters 24 in which four correlation signals relating to the corresponding position-measuring satellite 13 are input. Thereafter, in each of the third orthogonal frequency converters 24, a set of correlation signals is converted in frequency into an in-phase base signal and an orthogonal base signal orthogonal to each other according to one set of in-phase carrier oscillating signal and orthogonal oscillating signal. Because the frequency of the in-phase and orthogonal carrier oscillating signal is close to that of a corresponding carrier wave, the carrier wave included in each of the correlation signals is removed in the converters 24.

Thereafter, the thirty-two in-phase base signals and the thirty-two orthogonal base signals are time-integrated in the integrating units 25 in one-to-one correspondence each time the pseudo-noise code signals are generated in the pseudo-noise code generators 20, and sixty-four integrating signals indicating integrated values of the in-phase and orthogonal base signals are output to the control unit 26. In the control unit 28, code phases of the pseudo-noise code signals generated in the-pseudo-noise code generators 20 and frequencies of the carrier oscillating signals generated in the carrier local oscillators 23 are controlled according to the integrating signals to track the noise codes and the carrier waves peculiar to the eight position-measuring satellites 13. In other words, in cases where a code phase of a noise code in each position-measuring satellite 13 almost agrees with one of four code phases of the four pseudo-noise code signals corresponding to the position-measuring satellite 13 on condition that a frequency of a carrier wave in each position-measuring satellite 13 almost agrees with that of in-phase and orthogonal carrier oscillating signals generated in the carrier local oscillator 23, the satellite signals indicating the orbital information and the time information in each position-measuring satellite 13 are detected in the control unit 26. Therefore, when the code phases of the pseudo-noise code signals generated in the pseudo-noise code generators 20 and the frequencies of the in-phase and orthogonal carrier oscillating signals generated in the carrier local oscillator 23 almost agree with the code phases of the noise codes and the frequencies of the carrier waves in the position-measuring satellites 13 under the control of the control unit 26, the satellite signals detected are demodulated in the control unit 26 and are transferred to the measured position calculating unit 27.

In the unit 27, a position of the antenna 12 is calculated from eight pieces of orbital information and eight pieces of time information of the position-measuring satellites 13. Thereafter, the position of the antenna 12 is output from the outputting unit 28.

Accordingly, because the code phases of the pseudo-noise code signals generated in the pseudo-noise code generators 20 and the frequency of the in-phase and orthogonal carrier oscillating signals generated in the carrier local oscillator 23 are adjusted under the control of the control unit 26 to track the noise codes and the carrier waves peculiar to the eight position-measuring satellites 13, the satellite signals indicating the orbital information and the time information can be detected, and the position of the antenna 12 can be determined.

Also, because the four phase-types of the in-phase and orthogonal pseudo-noise code signals generated in the four pseudo-noise code generators 20 correspond to one code phase of one position-measuring satellite 13, the satellite signals of one position-measuring satellite 13 are scanned in a parallel processing to make one of the four phase-types agree with the code phase of one position-measuring satellite 13. Therefore, the satellite signals of each position-measuring satellite 13 can be quickly detected. That is, the position of the antenna 12 can be quickly determined.

2.2. PROBLEMS TO BE SOLVED BY THE INVENTION

However, in cases where a plurality of pseudo-noise code generators 20 are arranged for each of the position-measuring satellites 13, the number of correlation units 21 and the number of filters 22 are extremely increased. In this case, because many multipliers are required for each correlation unit 21, a circuit size of the conventional demodulator circuit 11 is enlarged, an electric power consumed in the conventional demodulator circuit 11 is increased, and a manufacturing cost of the conventional demodulator circuit 11 is increased.

Also, because only one carrier local oscillator 23 is arranged for each of the position-measuring satellites 13, the removal of the carrier wave cannot be quickly performed.

In addition, in a second conventional art, the in-phase and orthogonal correlation signals generated in the correlation units 21 are transformed according to a fast Fourier transformation, and the satellite signals of the position-measuring satellites 13 are detected. However, though the satellite signals of a plurality of position-measuring satellites 13 can be quickly detected, the processing of the fast Fourier transformation is complicated, and a manufacturing cost of a conventional demodulator circuit according to the second prior art is increased.

SUMMARY OF THE INVENTION

An object of the present invention is to provide, with due consideration to the drawbacks of such a conventional demodulator circuit in a global positioning system receiver, a demodulator circuit in a global positioning system receiver in which a consumed electric power is low and a manufacturing cost is low on condition that satellite signals of a plurality of position-measuring satellites are quickly detected.

The object is achieved by the provision of a demodulator circuit in a global positioning system comprising:

a pseudo-noise code generator for generating a pseudo-noise code of which a code phase agrees with that of a noise code peculiar to a satellite every sampling period;

correlation means for generating a correlation signal indicating a correlation between a radio wave transferred from the satellite and the pseudo-noise code generated by the pseudo-noise code generator every sampling period to remove the noise code from the radio wave, the radio wave being formed of the noise code, a satellite signal and a carrier wave modulated with the noise code and the satellite signal, and the correlation signal being formed of the satellite signal and the carrier wave modulated with the satellite signal;

a plurality of local oscillators for respectively generating a carrier oscillating signal every sampling period, oscillating frequencies of the carrier oscillating signals being close to a carrier frequency of the carrier wave of the correlation signal generated by the correlation means;

control means for controlling the local oscillators to make one of the oscillating frequencies of the carrier oscillating signals agree with the carrier frequency of the carrier wave of the correlation signal;

a plurality of frequency converters for respectively frequency-converting the correlation signal generated by the correlation means with one of the carrier oscillating signals generated by the local oscillators every sampling period to generate a plurality of base signals, each of the base signals being formed by removing the carrier wave from the correlation signal; and integrating means for time-integrating each of the base signals generated by the frequency converters to detect the satellite signal from one base signal generated with one carrier oscillating signal of which an oscillating frequency agrees with the carrier frequency of the carrier wave of the correlation signal under the control of the control means.

In the above configuration, a noise code peculiar go a satellite and a satellite signal are output from the satellite with a carrier wave as a radio wave every sampling period. Therefore, the carrier wave is modulated by the noise code and the satellite signal. To obtain the satellite signal from the radio wave, it is required to remove the noise code and the carrier wave modulated from the radio wave.

In the present invention, a correlation signal indicating a correlation between a radio wave transferred from a satellite and a pseudo-noise code generated by the pseudo-noise code generator is generated in the correlation means. Because a code phase of the pseudo-noise code agrees with that of the noise code peculiar to the satellite, the noise code is removed from the radio wave. Thereafter, the correlation signal is frequency-converted with each of the carrier oscillating signals generated by the local oscillators to form a plurality of base signals. In this case, because oscillating frequencies of the carrier oscillating signals are close to a carrier frequency of the carrier wave of the correlation signal, the carrier wave is almost removed from the correlation signal, and the base signals in which the carrier wave are not almost included can be obtained. In particular, because one of oscillating frequencies of the carrier oscillating signals agrees with the carrier frequency of the carrier wave of the correlation signal under the control of the control means, any carrier wave is not included in a particular base signal generated with the carrier oscillating signal of which the oscillating frequency agrees with the carrier frequency of the carrier wave of the correlation signal. Thereafter each of the base signals obtained every sampling period is time-integrated in the integrating means.

Accordingly, because any carrier wave is not included in a particular base signal, the satellite signal can be quickly detected by time-integrating the particular base signal.

Also, because only one pseudo-noise code corresponds to one satellite, the configuration of the correlation means can be simplified to generate the correlation signal from the pseudo-noise code. Therefore, a consumed electric power required in the demodulator circuit can be reduced, and a manufacturing cost of the demodulator circuit can be reduced.

The object is also achieved by the provision of a demodulator circuit in a global positioning system, comprising:

N pseudo-noise code generators for respectively generating a pseudo-noise code of which a code phase agrees with that of a noise code peculiar to one of N satellites every sampling period, the pseudo-noise code generators relating to the satellites in one-to-one correspondence;

N correlation elements for respectively generating a correlation signal indicating a correlation between one of radio waves transferred from the satellites and one of the pseudo-noise codes generated by the pseudo-noise code generators every sampling period to remove the noise codes from the radio waves, the correlating elements relating to the satellites in one-to-one correspondence, each of the radio waves being formed of one noise code, a satellite signal and a carrier wave modulated with the noise code and the satellite signal, and each of the correlation signals being formed of a satellite signal and a carrier wave modulated with the satellite signal;

(N×M) local oscillators for respectively generating one of M carrier oscillating signals corresponding to each of the N satellites every sampling period, M oscillating frequencies of the M carrier oscillating signals corresponding to a satellite being close to a carrier frequency of a carrier wave of one correlation signal which is generated by one correlating element corresponding to the same satellite;

(N×M) frequency converters for respectively frequency-converting one of the correlation signals generated by the correlation means with one of the carrier oscillating signals generated by the local oscillators to generate (N×M) base signals every sampling period, each of the correlation signals being frequency-converted M times with M carrier oscillating signals corresponding to the same satellite, each of the base signals being formed by removing a carrier wave from one of the correlation signals;

control means for controlling the local oscillators to make one of the oscillating frequencies of the M carrier oscillating signals corresponding to each of the N satellites agree with a carrier frequency of a carrier wave of one correlation signal which is generated by one correlating element corresponding to the same satellite; and integrating means for time-integrating each of the base signals generated by the frequency converters to detect the satellite signals of the N satellites from N base signals generated with N carrier oscillating signals of which N oscillating frequencies agree with the N carrier frequencies of the N carrier waves of the N correlation signals under the control of the control means.

In the above configuration, in cases where it is intended to detect a plurality of satellite signals transferred from N satellites each unit of M local oscillators and each unit of M frequency converters are operated to detect a satellite signal of one of the N satellites when any of the satellite signals transferred from the N satellites is not detected by the integrating means.

Accordingly, even though the detection of a plurality of satellite signals transferred from a plurality of satellites is required, because any carrier wave is not included in each of the base signals, the satellite signals can be quickly detected by time-integrating each of the base signals.

Also, because only one pseudo-noise code corresponds to one satellite, the configuration of the correlation means can be simplified to generate the correlation signal from the pseudo-noise code. Therefore, a consumed electric power required in the demodulator circuit can be reduced, and a manufacturing cost of the demodulator circuit can be reduced.

It is preferred that the demodulater circuit further comprises a selector switch for maintaining the connection of a particular frequency converter selected from M frequency converters corresponding to a particular satellite of which a satellite signal is detected by the integrating means to a particular correlation element corresponding to the particular satellite to track the satellite signal of the particular satellite and connecting the other (M−1) frequency converters corresponding to the particular satellite to one or more correlation elements corresponding to one or more satellites other than the particular satellite to operate the other (M−1) frequency converters and (M−1) local oscillators connected to the other (M−1) frequency converters for the detection of the satellite signals of the satellites other titan the particular satellite.

In the above configuration, when a satellite signal of a particular satellite is detected by the operation of the M local oscillators and the M frequency converters corresponding to the particular satellite, the connection of a particular frequency converter selected from the M frequency converters to a particular correlation element corresponding to the particular satellite is maintained by the selector switch. Therefore, the satellite signal of the particular satellite is tracked.

In contrast, the other (M−1) frequency converters corresponding to the particular satellite are connected to one or more correlation elements corresponding to one or more satellites other than the particular satellite by the selector switch. Therefore, the other (M−1) frequency converters and (M−1) local oscillators connected to the other (M−1) frequency converters are utilized to detect the satellite signals of the satellites other than the particular satellite.

Accordingly, because the other (M−1) frequency converters corresponding to the particular satellite and (M−1) local oscillators connected to the other (M−1) frequency converters are utilized to detect the satellite signals of the satellites other than the particular satellite after the satellite signal of the particular satellite is detected, the satellite signals of the satellites other than the particular satellite can be quickly detected on condition that the satellite signal of the particular satellite is reliably tracked.

The object is also achieved by the provision of a demodulator circuit in a global positioning system, comprising:

N pseudo-noise code generators for respectively generating a pseudo-noise code of which a code phase agrees with that of a noise code peculiar to one of N satellites every first sampling period, the pseudo-noise code generators relating to the satellites in one-to-one correspondence;

N correlating elements for generating N correlation signals in parallel respectively indicating a correlation between one of radio waves transferred from the satellites and one of the pseudo-noise codes generated by the pseudo-noise code generators every first sampling period to remove the noise codes from the radio waves, the correlating elements relating to the satellites in one-to-one correspondence, each of the radio waves being formed of one noise code, a satellite signal and a carrier wave modulated with the noise code and the satellite signal and each of the correlation signals being formed of a satellite signal and a carrier wave modulated with the satellite signal;

serial-parallel converting means for converting the N correlation signals generated in parallel by the correlating elements into the N correlation signals arranged in series to output the N correlation signals in series:

oscillating signal generating means for generating one of M carrier oscillating signals corresponding to each of the N satellites one after another every second sampling period for each of the satellites, M oscillating frequencies of the M carrier oscillating signals corresponding to a satellite being close to a carrier frequency of a carrier wave of one correlation signal which is generated by one correlating element corresponding to the same satellite, and the first sampling period being (N×M) times as long as the second sampling period;

frequency converting means for frequency-converting one of the correlation signals output from the serial-parallel converting means in series with one of the carrier oscillating signals generated by the oscillating signal generating means every second sampling period to generate (N×M) base signals every first sampling period, each of the correlation signals being frequency-converted M times with M carrier oscillating signals corresponding to the same satellite, each of the base signals being formed by removing a carrier wave from one of the correlation signals;

control means for controlling the oscillating signal generating means to make one of the oscillating frequencies of the M carrier oscillating signals corresponding to each of the N satellites agree with a carrier frequency of a carrier wave of one correlation signal which is generated by one correlating element corresponding to the same satellite; and integrating means for time-integrating each of the base signals generated by the frequency converters to detect the satellite signals of the N satellites from N base signals generated with N carrier oscillating signals of which N oscillating frequencies agree with the N carrier frequencies of the N carrier waves of the N correlation signals under the control of the control means.

In the above configuration, in cases where it is intended to detect a plurality of satellite signals transferred from N satellites, N correlation signals are output from the correlating elements in parallel every first sampling period. The N correlation signals output in parallel are rearranged in the serial-parallel converting means To output the N correlation signals in series. Therefore, each of the N correlation signals are input to the frequency converting means every second sampling period. Also, each of (N×M) carrier oscillating signals is generated by the oscillating signal generating means every second sampling period, and the (N×M) carrier oscillating signals are input to the frequency converting means in series. In this case, M carrier oscillating signals correspond to each of the N satellites.

In the frequency converting means, the N correlation signals are frequency-converted into (N×M) base signals with the (N×M) carrier oscillating signals one after another. Accordingly, because any carrier wave is not included in each of the base signals, the satellite signal can be quickly detected by time-integrating each of the base signals.

Also, because only one pseudo-noise code corresponds to one satellite, the configuration of the correlation means can be simplified to generate one correlation signal from the pseudo-noise code. Therefore, a consumed electric power required in the demodulator circuit can be reduced, and a manufacturing cost of the demodulator circuit can be reduced.

Also, because the N correlation signals output in parallel are rearranged in series in the serial-parallel converting means and because the (N×M) carrier oscillating signals are generated one after another by the oscillating signal generating means to output the (N×M) carrier oscillating signals in series, (N×M) base signals can be generated one after another in the frequency converting means. That is, because the (N×M) base signals are not generated in parallel, the configuration of the frequency converting means can be simplified.

BRIEF DESCRIPTION OF THE DRAWINGS

The objects, features and advantages of the present invention will be apparent from the following description taken in conjunction with the accompanying drawings, in which.

DESCRIPTION OF THE PREFERRED EMBODIMENTS

Preferred embodiments of a demodulator circuit in a global positioning system receiver according to the present invention are described will reference to drawings.

Figure 1:
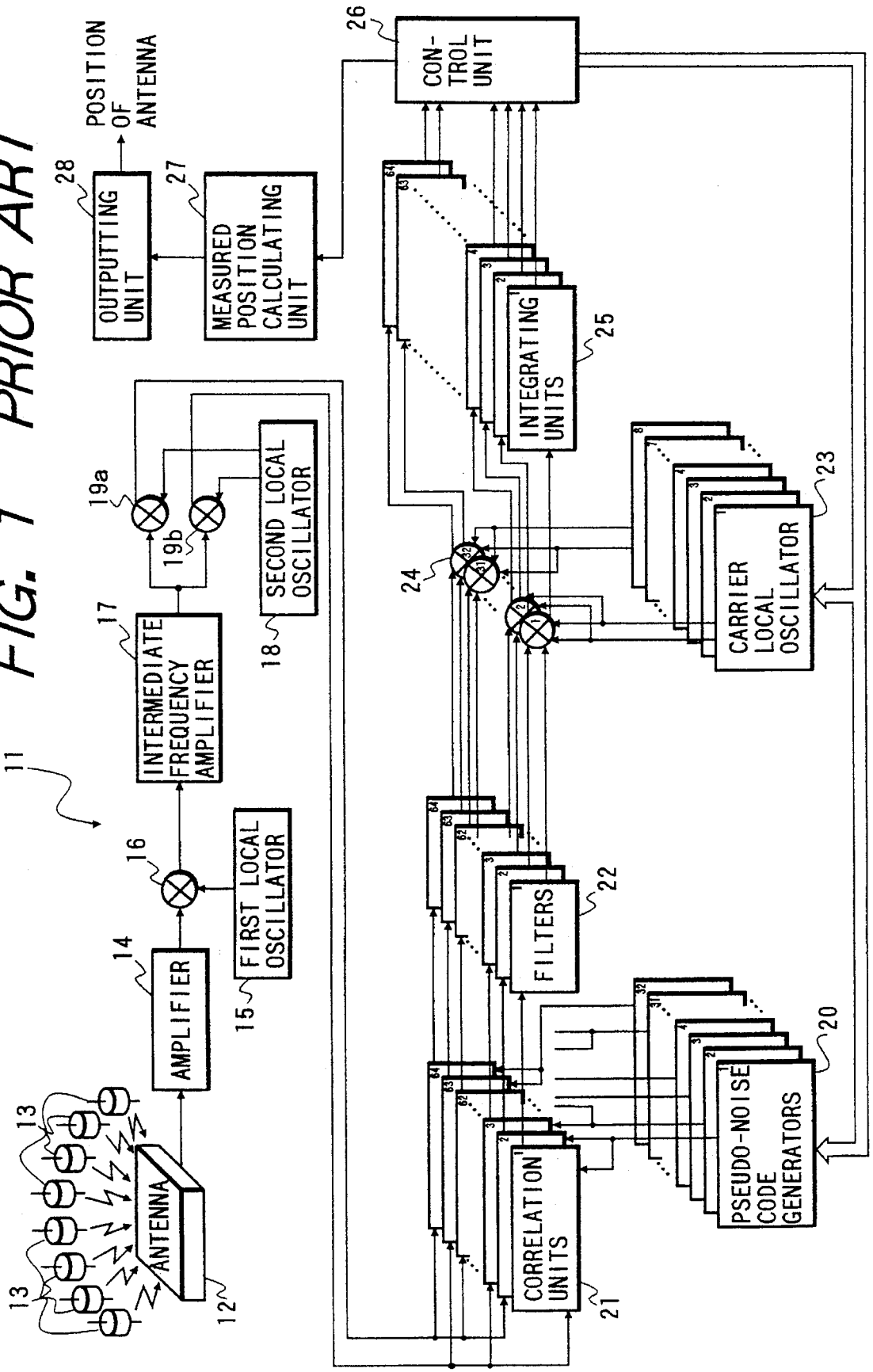
FIG. 1 is a block diagram of a conventional demodulator circuit of a global system receiver in which 32 types of signals in 8 channels are demodulated.
Figure 2:
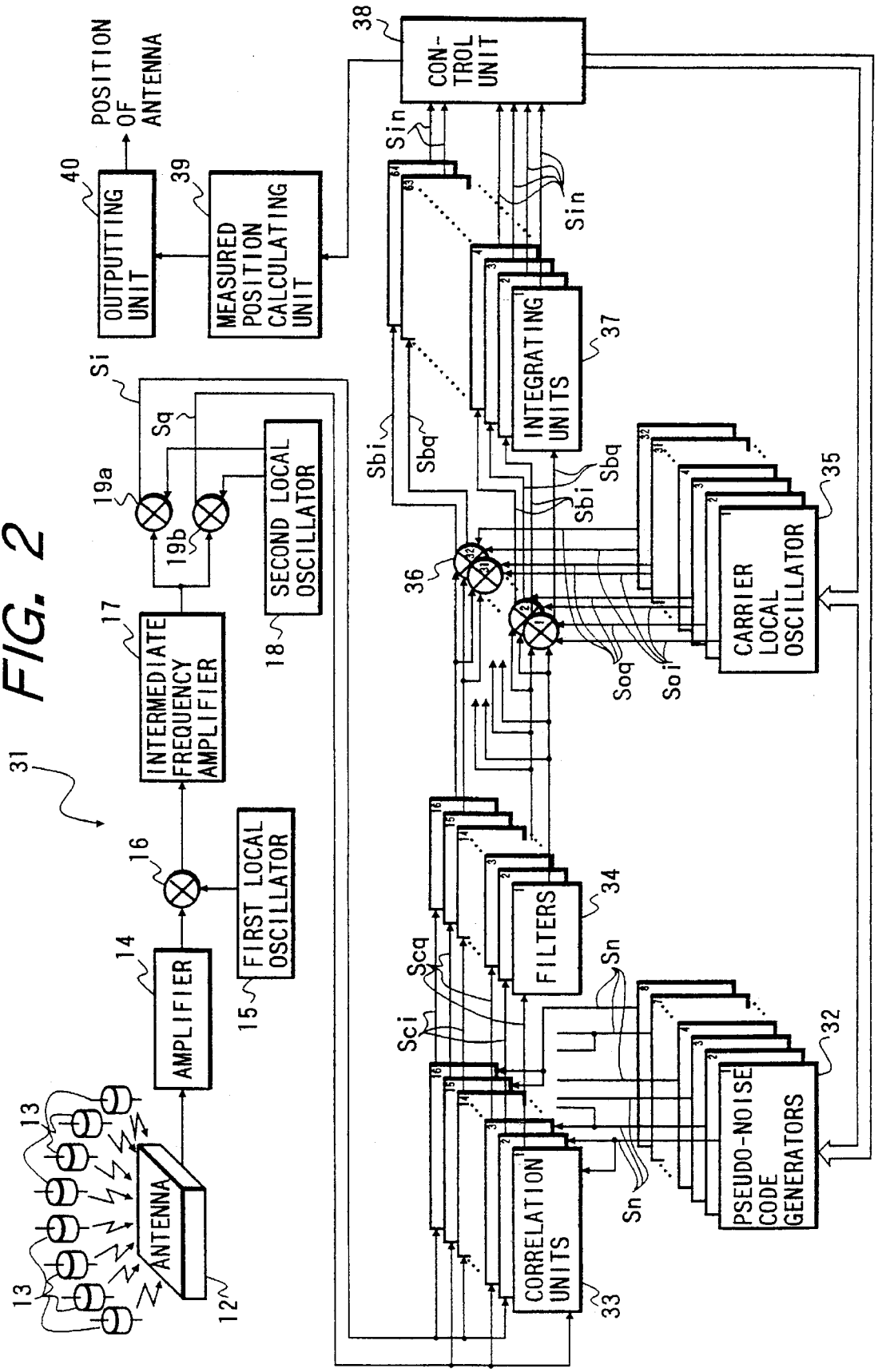
FIG. 2 is a block diagram of a demodulator circuit of a global system receiver according to a first embodiment of the present invention in which 32 types of signals in 8 channels are demodulated.
Figure 3:
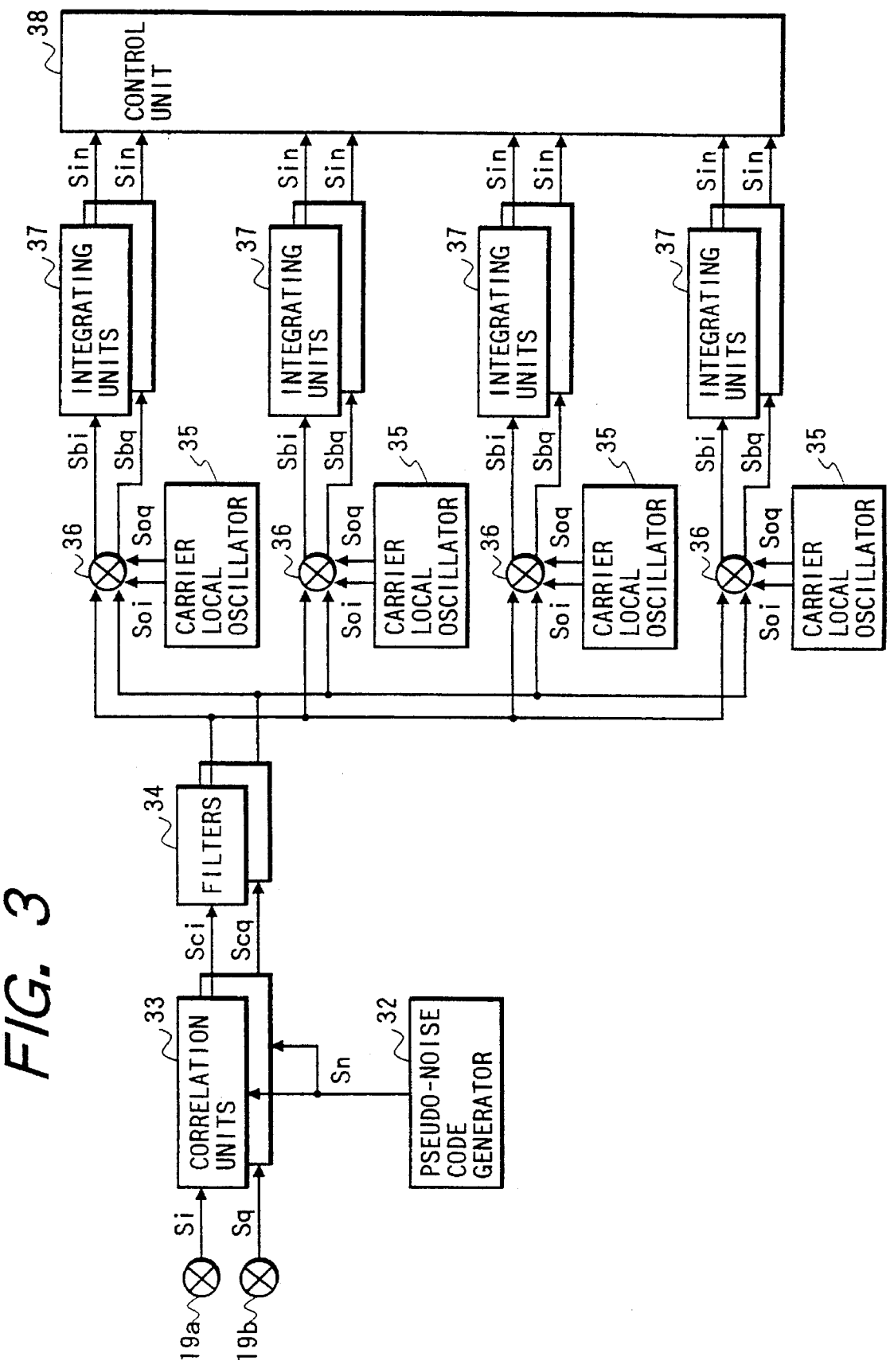
FIG. 3 is a block diagram showing main elements of the demodulator circuit shown in FIG. 2, the main elements corresponding to one position-measuring satellite.

FIG. 2 is a block diagram of a demodulator circuit of a global system receiver according to a first embodiment of the present invention in which 32 types of signals in 8 channels (or eight satellites) are demodulated. FIG. 3 is a block diagram showing main elements of the demodulator circuit shown in FIG. 2, the main elements corresponding to one position-measuring satellite 13.

As shown in FIGS. 2 and 3, a demodulator circuit 31 comprises the antenna 12 for receiving eight types of radio waves transferred from the eight position-measuring satellites (NAVSTAR) 13 every sampling period, the amplifier 14, the oscillator 15, the mixing unit 16, the intermediate frequency amplifier 17, the second local oscillator 18, the first orthogonal frequency converter 19a, the second orthogonal frequency converter 19b, eight pseudo-noise code generators 32 for respectively generating one pseudo-noise code signal Sn indicating a pseudo-noise code corresponding to a noise code peculiar to one of the eight position-measuring satellites 13 every sampling period, sixteen correlation units 33 for generating eight in-phase correlation signals Sci indicating degrees of correlation between the in-phase signal Si and the eight pseudo-noise code signals Sn and eight orthogonal correlation signals Scq indicating degrees of correlation between the orthogonal signal Sq and the eight pseudo-noise code signals Sn every sampling period, sixteen filters 34 for filtering the eight in-phase correlation signals Sci and the eight orthogonal correlation signals Scq every sampling period, thirty-two carrier local oscillators 35 for respectively generating one of four in-phase carrier oscillating signals Soi and one of four orthogonal carrier oscillating signals Soq corresponding to one of eight carrier waves of the radio waves transferred from the position-measuring satellites 13 every sampling period, thirty-two third orthogonal frequency converters 36 for respectively receiving a set of correlation signals Sc composed of an in-phase correlation signal Sci and an orthogonal correlation signal Scq filtered in The filters 34 and respectively frequency-converting one of thirty-two sets of correlation signals Sc into an in-phase base signal Sbi and an orthogonal base signal Sbq orthogonal to each other according to one set of in-phase carrier oscillating signal Soi and orthogonal oscillating signal Soq generated in one of the carrier local oscillators 35 every sampling period, sixty-four integrating units 37 for time-integrating the sixty-four in-phase and orthogonal base signals Soi and Soq each time the pseudo-noise code signals Sn are generated in the pseudo-noise code generators 32 to form sixty-four integrating signals Sin respectively indicating an integrated value of one in-phase or orthogonal base signal Sbi or Sbq repeatedly time-integrated, a control unit 38 for controlling eight code phases of the pseudo-noise code signals Sn generated in the pseudo-noise code generators 32 and frequencies of the carrier oscillating signals Soi and Soq generated in the carrier local oscillators 35 according to the integrating signals Sin to track the noise codes and the carrier waves peculiar to the eight position-measuring satellites 13, a measured position calculating unit 39 for calculating a position of the antenna 12 from eight pieces of orbital information and eight pieces of time information of the position-measuring satellites 13 included in the integrating signals, and an outputting unit 40 for outputting the position of the antenna 12.

In the above configuration, an operation performed in the demodulator circuit 31 is described.

A noise code and satellite signals indicating a piece of orbital information and a piece of time information are output with a carrier wave from each position-measuring satellite 13 as a radio wave. That is, the carrier wave is modulated by the noise code peculiar to each of the satellites 13 and the satellite signal, and an energy of the radio wave is diffused.

When the radio waves of a plurality of position-measuring satellite 13 are received in the antenna 12 of a movable body such as a mobile, ship or aircraft, the radio waves received in the antenna 12 are Doppler-shifted and are transformed into an in-phase signal Si and an orthogonal signal Sq in the same manner as in the conventional demodulator circuit 11 while the radio waves pass though the amplifier 14, the mixing unit 16, the intermediate frequency amplifier 17 an the first and second orthogonal frequency converters 19a and 19b.

In each of the pseudo-noise code generators 32, a pseudo-noise code signal Sn indicating a pseudo-noise code almost agreeing with a noise code peculiar to one position-measuring satellite 13 are generated under the control of the control unit 38. Therefore, eight pseudo-noise code signals Sn corresponding to the eight position-measuring satellite 13 are generated in the eight pseudo-noise code generators 32 in one-to-one correspondence.

Thereafter, eight in-phase correlation signals Sci indicating degrees of correlation between the in-phase signal Si and the eight pseudo-noise code signals Sn are generated in eight correlation units 33. Also, eight orthogonal correlation signals Scq indicating degrees of correlation between the orthogonal signal Sq and the eight pseudo-noise code signals Sn are generated in the other eight correlation units 33. In this case, the stronger a degree of correlation, the lower a frequency of in-phase and orthogonal correlation signals Si and Sq relating to the correlation. Also, because the pseudo-noise code signals Sn generated in the eight pseudo-noise code generators 32 correspond to the noise codes of the position-measuring satellites 13, the noise codes included in the in-phase signal Si and the orthogonal signal Sq are removed in the correlation units 33. In other words, a carrier wave of each of the in-phase and orthogonal correlation signals Sci and Scq is modulated by only the satellite signals of a corresponding position-measuring satellite 13.

Thereafter, the eight orthogonal correlation signals Scq and the eight in-phase correlation signals Sci are filtered in the sixteen filters 34 in one-to-one correspondence to pass orthogonal correlation signals Scq and in-phase correlation signals Sci respectively having a low frequency. That is, an intensity of an in-phase or orthogonal correlation signal Sci or Scq indicating a weak correlation is reduced in the filter 34, and an intensity of an in-phase or orthogonal correlation signal Sci or Scq indicating a strong correlation are maintained at a high value in the filter 34.

In each of the carrier local oscillators 35, one of four in-phase carrier oscillating signals Soi and one of four orthogonal carrier oscillating signals Soq orthogonal to each other are generated. As shown in FIG. 3, the four in-phase carrier oscillating signals Soi and the four orthogonal carrier oscillating signals Soq generated in four carrier local oscillators 35 correspond to a carrier wave of one of the radio waves transferred from the position-measuring satellites 13. That is, four frequencies of four sets of four in-phase carrier oscillating signals Soi and four orthogonal carrier oscillating signals Soq are adjusted under the control of the control unit 38 to be close to a frequency of a carrier wave transferred from a corresponding position-measuring satellite 13, and one of the four frequencies is adjusted to be almost the same as the frequency of the carrier wave. Therefore, thirty-two sets of in-phase and orthogonal carrier oscillating signals Soi and Soq having thirty-two difference frequencies are generated in the carrier local oscillators 35.

Thereafter, as shown in FIG. 3, each of eight sets of correlation signals which each are composed of an in-phase correlation signal Soi and an orthogonal correlation signal Scq corresponding to a position-measuring satellite 13 is input from a filter 34 to four third orthogonal frequency converters 36. Also, thirty-two sets of oscillating signals respectively composed of an in-phase carrier oscillating signal Soi and an orthogonal carrier oscillating signal Soq are transferred from the thirty-two carrier local oscillators 35 to the thirty-two third orthogonal frequency converters 36 in one-to-one correspondence. In this case, a set of in-phase and orthogonal carrier oscillating signals Soi and Soq and a set of correlation signals Sci and Scq input to the same third orthogonal frequency converter 36 correspond to the same position-measuring satellite 13.

Thereafter, in each of the third orthogonal frequency converters 36, a set of correlation signals Sci and Scq is converted in frequency into an in-phase base signal Sbi and an orthogonal base signal Sbq orthogonal to each other according to one set of in-phase and orthogonal carrier oscillating signals Soi and Soq generated in the carrier local oscillators 35. Because the frequencies of the in-phase and orthogonal carrier oscillating signals Soi and Soq are close to a frequency of a carrier wave in each of the position-measuring satellites 13, the carrier wave included in each of the correlation signals Sci and Scq is removed in the converters 36.

Thereafter, the thirty-two in-phase base signals Sbi and the thirty-two orthogonal base signals Sbq are time-integrated in the integrating units 37 in one-to-one correspondence each time the pseudo-noise code signals Sn are generated in the pseudo-noise code generators 32, and an integrating signal Sin indicating an integrated value of the in-phase or orthogonal base signal Sbi or Sbq repeatedly input is output from each of the integrating units 37 to the control unit 38. In the control unit 26, code phases of the pseudo-noise code signals Sn generated in the pseudo-noise code generators 32 and frequencies of the carrier oscillating signals Soi and Soq generated in the carrier local oscillators 35 are controlled according to the integrating signals Sin to track the noise codes and the carrier waves peculiar to the eight position-measuring satellites 13. In other words, in cases where one of four frequencies of four in-phase and orthogonal carrier oscillating signals Soi and Soq corresponding to one position-measuring satellite 13 almost agrees with a frequency of a carrier wave in the corresponding position-measuring satellite 13 for each of the position-measuring satellite 13 on condition that a pseudo-noise code signal Sn corresponding to a position-measuring satellite 13 almost agrees with a code phase of a noise code of the corresponding position-measuring satellite 13 for each of the position-measuring satellite 13, the satellite signals indicating the orbital information and the time information in each position-measuring satellite 13 are detected in the control unit 38. Therefore, when the code phases of the pseudo-noise code signals Sn generated in the pseudo-noise code generators 32 and the frequencies of the in-phase and orthogonal carrier oscillating signals Soi and Soq generated in the carrier local oscillator 35 almost agree with the code phases of the noise codes and the frequencies of the carrier waves of the position-measuring satellites 13 under the control of the control unit 38, the satellite signals detected are demodulated in the control unit 38 and are transferred to the measured position calculating unit 39, In the unit 39, a position of the antenna 12 is calculated from eight pieces of orbital information and eight pieces of time information of the position-measuring satellites 13. Thereafter, the position of the antenna 12 is output from The outputting unit 40.

Accordingly, as shown in FIGS. 2 and 8, four carrier local oscillators 35 in which four in-phase carrier oscillating signals Soi and four orthogonal carrier oscillating signals Soq corresponding to one position-measuring satellite 13 are generated are arranged in the demodulator circuit 31, a frequency of a carrier wave of one position-measuring satellite 13 can be detected with four frequencies of the four in-phase and orthogonal carrier oscillating signals Soi and Seq. Therefore, a scanning speed for detecting the frequency of the carrier wave of each position-measuring satellite 13 is four times as high as that in the conventional demodulator circuit 11.

Also, because the number of pseudo-noise code generators 32 is reduced to ¼ as compared with the number of pseudo-noise code generators 20 in the conventional demodulator circuit 11. The number of correlation units 33 and the number of filters 34 can be respectively reduced to ¼ as compared with those in the conventional demodulator circuit 11, and the configuration of the demodulator circuit 31 can be simplified. Accordingly, a consumed electric power in the demodulator circuit 31 can be lowered and a manufacturing cost of the demodulator circuit 31 becomes low on condition that satellite signals of a plurality of position-measuring satellites 13 are quickly detected.

In the first embodiment, the number of position-measuring satellites 13 is eight (or 8 channels) and four carrier local oscillators 35 correspond to one position-measuring satellite 13 to generate the thirty-two in-phase and orthogonal carrier oscillating signals Soi and Soq in the thirty-two carrier local oscillators 35. However, the number of position-measuring satellites 13 is not limited to eight. Also, the number of carrier local oscillators 35 correspond to one position-measuring satellite 13 is not limited to four.

Also, each element of the demodulator circuit 31 can be formed of an analog circuit or a digital circuit in which an arithmetic processing equivalent to a method using an arithmetic apparatus is performed.

Next, a second embodiment according to the present invention is described with reference to FIG. 4.

Figure 4:
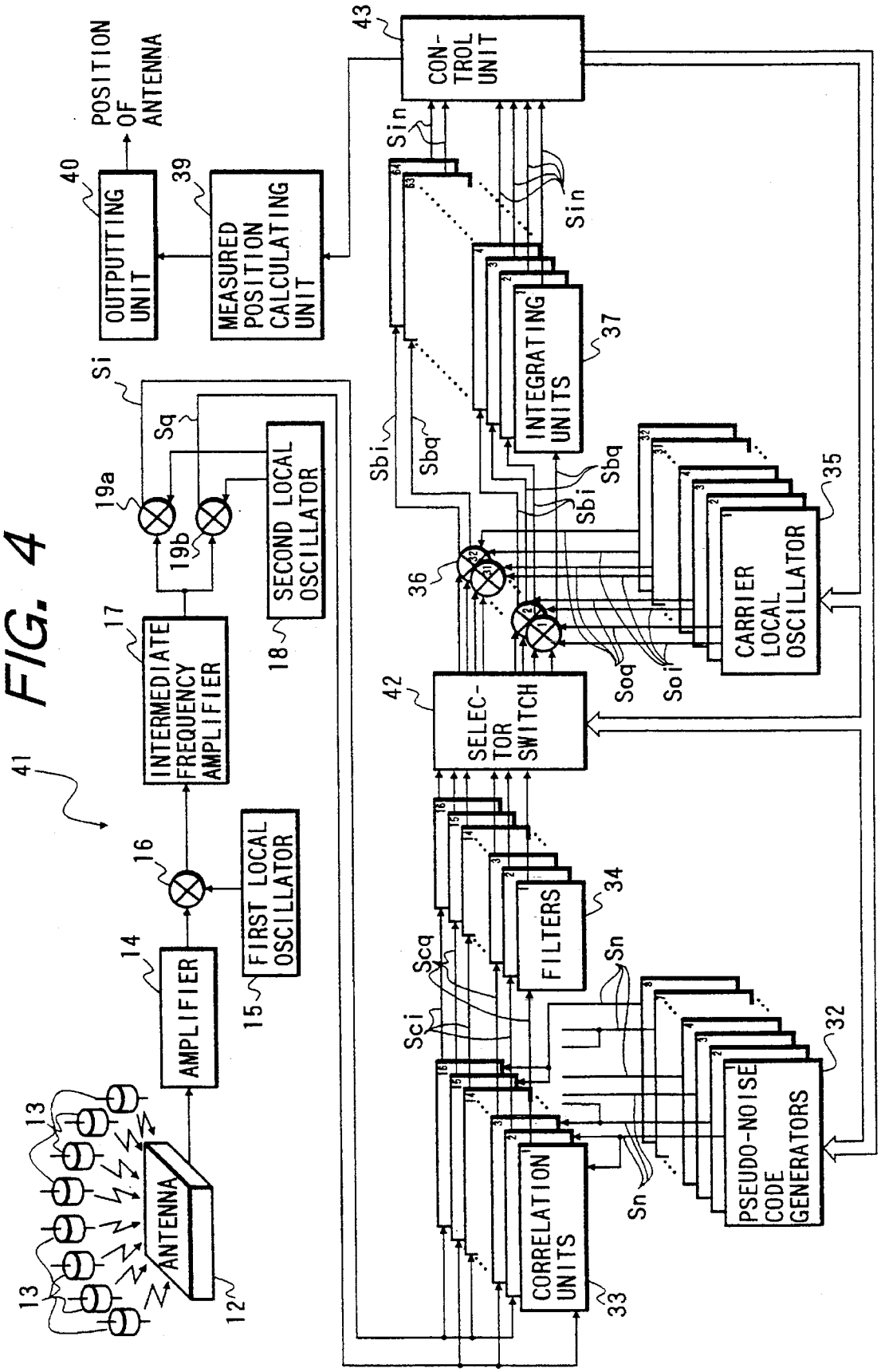
FIG. 4 is a block diagram of a demodulator circuit of a global system receiver according to a second embodiment of the present invention in which 32 types of signals in 8 channels are demodulated.

FIG. 4 is a block diagram of a demodulator circuit of a global system receiver according to a second embodiment of the present invention in which 32 types of signals in 8 channels (or eight satellites) are demodulated.

As shown in FIG. 4, a demodulator circuit 41 comprises the antenna 12 for receiving eight types of radio waves transferred from the eight position-measuring satellites (NAVSTAR) 13, the amplifier 14, the oscillator 15, the mixing unit 16, the intermediate frequency amplifier 17, the second local oscillator 18, the first orthogonal frequency converter 19a, the second orthogonal frequency converter 19b, the eight pseudo-noise code generators 32, the sixteen correlation units 33, the sixteen filters 34, the thirty-two carrier local oscillators 35, the thirty-two third orthogonal frequency converters 36 corresponding to the eight position-measuring satellites 13, a selector switch 42 for changing a connective relationship between the filters 34 and the third orthogonal frequency converters 36 in dependence on whether satellite signals of one or more position-measuring satellites 13 are detected, the sixty-four integrating units 37, a control unit 43 for controlling eight code phases of the pseudo-noise code signals generated in the pseudo-noise code generators 32, frequencies of the carrier oscillating signals generated in the carrier local oscillators 35 and the selection performed in the selector switch 42 according to the integrating signals to track the noise codes and the carrier waves peculiar to one or more position-measuring satellites 13 of which the satellite signals are not detected, the measured position calculating unit 39, and the outputting unit 40.

In the above configuration, an operation performed in the demodulator circuit 41 is described.

In the same manner as in the first embodiment, the eight orthogonal correlation signals Scq and the eight in-phase correlation signals Sci are filtered ill the sixteen filters 34 in one-to-one correspondence. Thereafter, because any satellite signal of the eight position-measuring satellites 13 is not initially detected, all of the third orthogonal frequency converters 36 are selected by the selector switch 42, and the third orthogonal frequency converters 36 and the integrating units 37 are operated in the same manner as in the first embodiment.

Thereafter, when satellite signals of a particular position-measuring satellite 13 are detected by the control unit 43, a particular third orthogonal frequency converter 36 is selected from among four third orthogonal frequency converters 36 corresponding to the particular position-measuring satellite 13 under the control of the control unit 43, and the particular third orthogonal frequency converter 36 are connected to a pair of particular filters 34 corresponding to the particular position-measuring satellite 13 through the selector switch 42 under the control of the control unit 43. Therefore, only the particular third orthogonal frequency converter 36 is utilized to track the satellite signals detected after the satellite signals of the particular position-measuring satellite 13 are detected.

Also, the remaining three third orthogonal frequency converter 36 not selected are connected to other particular filters 34 not corresponding to the particular position-measuring satellite 13 through the selector switch 42 under the control of the control unit 43. Therefore, the remaining three third orthogonal frequency converter 36 are utilized to detect the satellite signals of the other position-measuring satellites 13.

Thereafter, a particular carrier local oscillator 35 and a pair of particular integrating units 37 connected to the particular third orthogonal frequency converter 36 are utilized to Track the satellite signals detected, and other carrier local oscillators 35 and other pairs of integrating units 37 connected to the remaining three third orthogonal frequency converter 36 are utilized to detect the satellite signals of the other position-measuring satellites 13.

Therefore, when satellite signals of one or more position-measuring satellites 13 are detected, a particular third orthogonal frequency converter 36 selected from among four third orthogonal frequency converters 36 can be privately utilized to track the satellite signals detected for each of the position-measuring satellites 13, and the other third orthogonal frequency converters 36 corresponding to the position-measuring satellites 13 of which the satellite signals are detected can be utilized to detect satellite signals of other position-measuring satellites 13 of which satellite signals are not detected. Accordingly, the satellite signals of the other position-measuring satellites 13 not detected can be more quickly detected.

In the second embodiment, each element of the demodulator circuit 41 can be formed of an analog circuit or a digital circuit in which an arithmetic processing equivalent to a method using an arithmetic apparatus is performed.

Next, a third embodiment according to the present invention is described with reference to FIG. 5.

Figure 5:
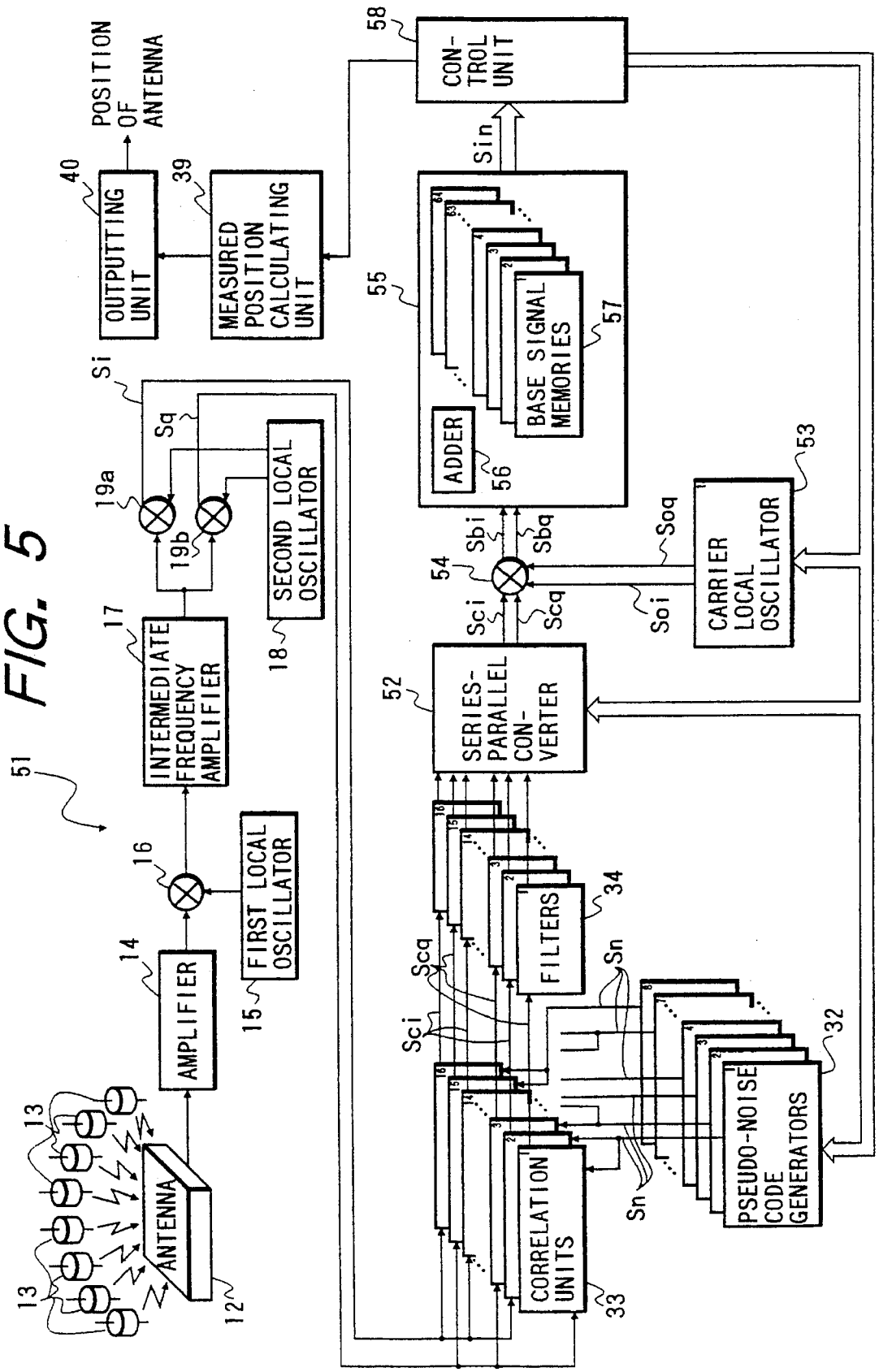
FIG. 5 is a block diagram of a demodulator circuit of a global system receiver according to a third embodiment of the present invention in which 32 types of signals in 8 channels are demodulated.

FIG. 5 is a block diagram of a demodulator circuit of a global system receiver according to a third embodiment of the present invention in which 32 types of signals in 8 channels (or eight satellites) are demodulated.

As shown in FIG. 5, a demodulator circuit 51 comprises the antenna 12 for receiving eight types of radio waves transferred from the eight position-measuring satellites (NAVSTAR) 13, the amplifier 14, the oscillator 15, the mixing unit 16, the intermediate frequency amplifier 17, the second local oscillator 18, the first orthogonal frequency converter 19a, the second orthogonal frequency converter 19b, the eight pseudo-noise code generators 32, the sixteen correlation units 33, the sixteen filters 34, a series-parallel converter 52 for converting the eight orthogonal correlation signals Scq and the eight in-phase correlation signals Sci transferred from the sixteen filters 34 in parallel every first sampling period F into eight sets of correlation signals Sc, which each are composed of an orthogonal correlation signal Scq and an in-phase correlation signal Sci, output in series every second sampling period F/32 on condition that each set of correlation signals Sc is repeatedly output four times, a carrier local oscillator 53 for generating one of four in-phase carrier oscillating signals Soi and one of four orthogonal carrier oscillating signals Soq corresponding to one of eight carrier waves of the radio waves transferred from the position-measuring satellites 13 in time-sequence and outputting thirty-two sets of in-phase and orthogonal carrier oscillating signals Soi and Soq in time-sequence every second sampling period F/32, a single third orthogonal frequency converter 54 for repeatedly receiving a set of correlation signals filtered in the filters 34 thirty-two times every second sampling period F/32 and frequency-converting the set of correlation signals Sc into an in-phase base signal Sbi and an orthogonal base signal Sbq orthogonal to each other according to one set of in-phase and orthogonal carrier oscillating signals Soi and Soq output from the carrier local oscillator 53, an integrating unit 55 having an adder 56 and sixty-four base signal memories 57 for storing the thirty-two in-phase base signals Sbi and the thirty-two orthogonal base signal Sbq transferred from the third orthogonal frequency converters 54 in the base signal memories 57 in one-to-one correspondence and time-integrating each of the sixty-four in-phase and orthogonal base signals Sbi and Sbq stored in the base signal memories 57 each time the pseudo-noise code signals Sn are generated every first sampling period F in the pseudo-noise code generators 32 to form sixty-four integrating signals Sin respectively indicating an integrated value of one in-phase or orthogonal base signal Sbi or Sbq repeatedly time-integrated, a control unit 58 for controlling eight code phases of the pseudo-noise code signals Sn generated in the pseudo-noise code generators 32, frequencies of the carrier oscillating signals Soi and Soq generated in the carrier local oscillators 35 according to the integrating signals Sin and the conversion performed in the series-parallel converter 52 to track the noise codes and the carrier waves peculiar to the eight position-measuring satellites 13, the measured position calculating unit 39, and the outputting unit 40.

In the above configuration, all operation performed in the demodulator circuit 51 is described.

In the same manner as in the first embodiment, the eight orthogonal correlation signals Scq and the eight in-phase correlation signals Sci are filtered in the sixteen filters 34 In one-to-one correspondence every first sampling period F. Thereafter, in the series-parallel converter 52, the eight orthogonal correlation signals Scq and the eight in-phase correlation signals Sci transferred from the sixteen filters 34 in parallel every first sampling period F are converted into eight sets of correlation signals Sc respectively composed of an orthogonal correlation signal Scq and an in-phase correlation signal Sci which are arranged in series, and each of the sets of correlation signals Sc are repeatedly output to the third orthogonal frequency converter 54 every second sampling period F/32. In this case, the same set of correlation signals Sc is repeatedly output four times.

Also, in the carrier local oscillator 53 thirty-two sets of the oscillating signals respectively composed of an in-phase carrier oscillating signal Soi and an orthogonal carrier oscillating signal Soq are generated in time-sequence, and each of sets of the oscillating signals is output to the third orthogonal frequency converter 54 in time sequence every second sampling period F/32.

In the third orthogonal frequency converter 54, an in-phase base signal Sbi and an orthogonal base signal Sbq are generated in time sequence every second sampling period F/32, and the sixty-four in-phase and orthogonal base signals Sbi and Sbq generated every first sampling period F are stored in the base signal memories 64 in time sequence in one-to-one correspondence. Also, the sixty-four in-phase and orthogonal base signals Sbi and Sbq stored in the base signal memories 64 are time-integrated in the same manner as in the accumulating units 37.

Therefore, because the parallel arrangement of the eight sets of correlation signals Sc produced in the filters 34 is converted into the series arrangement in the series-parallel converter 52, the eight sets of correlation signals Sc can be converted into the thirty-two sets of base signals in the third orthogonal frequency converter 54 every first sampling period F in the same manner as in the third orthogonal frequency converters 35. Accordingly, the configuration of the demodulator circuit 51 can be simplified.

Also, because the integrating unit 55 is utilized in place of the integrating units 37, the configuration of the demodulator circuit 51 can be simplified.

In the third embodiment, it is preferred that a block of the series-parallel converter 52, the carrier local oscillator 53, the third orthogonal frequency converter 54, the integrating unit 55, the control unit 58, the measured position calculating unit 39 and the outputting unit 40 be formed of a digital circuit or an arithmetic processing unit equivalent to an apparatus using an arithmetic apparatus.

Next, a fourth embodiment according to the present invention is described with reference to FIG. 6.

Figure 6:
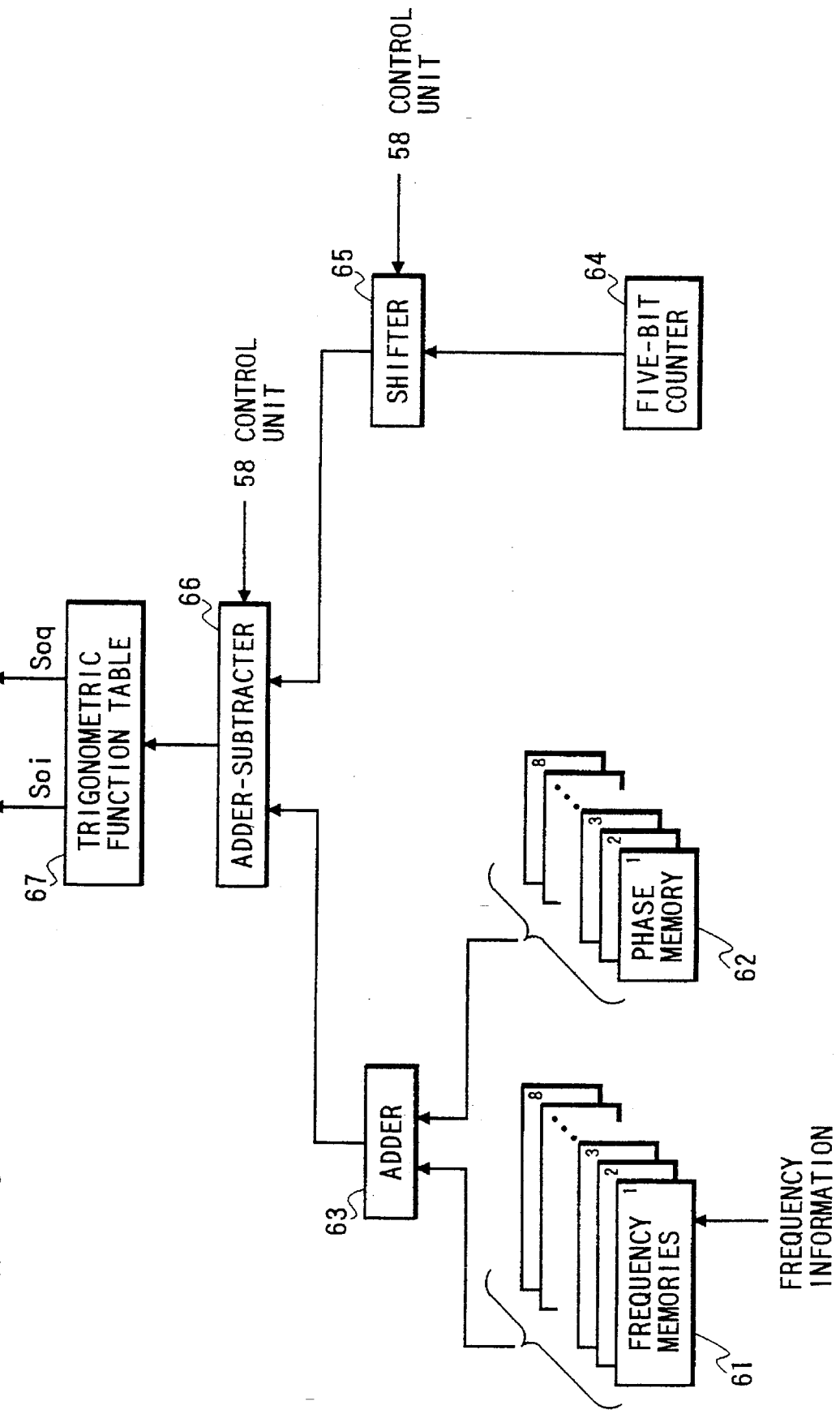
FIG. 6 is a block diagram of a carrier local oscillator shown in FIG. 5 according to a fourth embodiment of the present invention.

FIG. 6 is a block diagram of the carrier local oscillator 53 according to a fourth embodiment of the present invention.

As shown in FIG. 6, the carrier local oscillator 53 comprises eight frequency memories 61 for storing eight pieces of frequency information indicating eight frequencies of eight carrier waves of the eight position-measuring satellites 13 which are set by the control unit 58, eight phase memories 62 for storing eight types of phases corresponding to the eight position-measuring satellites 13, an adder 63 for adding one of the frequency information and one of the types of phases corresponding to the same position-measuring satellite 13 in time sequence every second sampling period F/32 to generate eight fundamental oscillating signals corresponding to the eight position-measuring satellites 13, a five-bit counter 64 for counting four counted values every second sampling period F/32, a shifter 65 for generating four types of phases shifting by frequency differences −N/32, 0/32, N/32 and 2*N/32 according to the counted values under the control of the control unit 58, an adder-subtracter 66 for adding each of the four types of phases to each of phases of the eight fundamental oscillating signals one after another to form thirty-two local oscillating signals having thirty-two phases, and a trigonometric function table 67 for converting the phases of the local oscillating signals into thirty-two amplitudes to form thirty-two sets of in-phase and orthogonal carrier oscillating signals Soi and Soq.

A numerical control oscillator 68 is composed of the frequency memories 61, the phase memories 62, the adder 63 and the trigonometric function table 67, and eight fundamental oscillating signals amplitude-modulated are formed in the numerical control oscillator 68.

In the above configuration, eight fundamental oscillating signals corresponding to the eight position-measuring satellites 13 are generated in the adder 63. Also, four types of phases shifting by frequency differences $-N/32=-1$ KHz. $0/32=0$ KHz, $N/32=+1$ KHz and $2*N/32=+2$ KHz are generated in the shifter 65. Thereafter, each of the four types of phases and each of phases of the eight fundamental oscillating signals are added one after another in the adder-subtracter 66 to form thirty-two local oscillating signals in which phases shift by frequency differences $-1$ KHz, 0 KHz, $+1$ KHz and $+2$ KHz from a phase of each fundamental oscillating signal. Thereafter, the phases of the local oscillating signals are converted into amplitudes in the trigonometric function table 67, and thirty-two sets of in-phase and orthogonal carrier oscillating signals Soi and Soq are formed.

Accordingly, because the four types of phases are added to phases of the eight fundamental oscillating signals the number of types of carrier oscillating signals can be easily increased.

In the fourth embodiment, frequency differences $-1$ KHz, 0 KHz, $+1$ KHz and $+2$ KHz are utilized. However, other frequency differences can be used by changing a sampling period or the counter 64. Also, another element can be used as the adder 63.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A demodulator circuit in a global positioning system, comprising:

only one pseudo-noise code generator for generating a pseudo-noise code having a code phase agreeing with a code phase of a noise code peculiar to a respectively corresponding satellite every sampling period;

correlation means for generating a correlation signal indicating a correlation between a radio wave transferred from the satellite and the pseudo-noise code generated by the pseudo-noise code generator respectively corresponding thereto every sampling period to remove the noise code from the radio wave, the radio wave being formed of the noise code, a satellite signal and a carrier wave modulated with the noise code and the satellite signal, and the correlation signal being formed of the satellite signal and the carrier wave modulated with the satellite signal;

a plurality of local oscillators for generating respective carrier oscillating signals every sampling period, a plurality of said carrier oscillating signals having oscillating frequencies which are close to a carrier frequency of the carrier wave of the correlation signal generated by the correlation means;

a plurality of frequency converters for respectively frequency-converting the correlation signal generated by said correlation means with one of the carrier oscillating signals generated by said local oscillators every sampling period to generate a plurality of base signals, each of the base signals being formed by removing the carrier wave from the correlation signal;

integrating means for time-integrating each of the base signals generated by the frequency converters and obtaining a plurality of integrating signals; and control means for controlling the pseudo-noise code generator according to the integrating Signals obtained by the integrating means to make the code phase of the pseudo-noise code agree with that of the noise code peculiar to the satellite, controlling the local oscillators according to the integrating signals to make a particular oscillating frequency of a particular carrier oscillating signal generated by one of the local oscillators agree with the carrier frequency of the carrier wave of the correlation signal, and detecting the satellite signal of the satellite from a particular integrating signal obtained by the integrating means which relates to a particular base signal generated with the particular carrier oscillating signal by one of the frequency converters.

2. A demodulator circuit according to claim 1, further comprising:

filtering means for filtering the correlation signal generated by the correlation means to reduce an intensity of the correlation signal in case where the correlation indicated by the correlation signal is weak, the correlation signal filtered being frequency-converted by the frequency converters.

3. A demodulator circuit according to claim 1, further comprising:

an antenna for receiving the radio wave transferred from the satellite, the radio wave received being converted into the correlation signal in the correlation means;

measured position calculating means for calculating a position of the antenna from the satellite signal detected by the control means; and outputting means for outputting the position of the antenna calculated by the measured position calculating means.

4. A demodulator circuit in a global positioning system, comprising:

N pseudo-noise code generators for respectively generating a pseudo-noise code of which a code phase agrees with that of a noise code peculiar to one of N satellites every sampling period, the pseudo-noise code generators relating to the satellites in one-to-one correspondence;

N correlating elements for respectively generating a correlation signal indicating a correlation between one of radio waves transferred from the satellites and one of the pseudo-noise codes generated by the pseudo-noise code generators every sampling period to remove the noise codes from the radio waves, the correlating elements relating to the satellites in one-to-one correspondence, each of the radio waves being formed of one noise code, a satellite signal and a carrier wave modulated with the noise code and the satellite signal, and each of the correlation signals being formed of a satellite signal and a carrier wave modulated with the satellite signal;

(N×M) local oscillators for respectively generating one of M carrier oscillating signals corresponding to each of the N satellites every sampling period, M oscillating frequencies of the M carrier oscillating signals corresponding to a satellite being close to a carrier frequency of a carrier wave of one correlation signal which is generated by one correlating element corresponding to the same satellite;

(N×M) frequency converters for respectively frequency-converting one of the correlation signals generated by the correlating elements with one of the carrier oscillating signals generated by the local oscillators every sampling period to generate (N×M) base signals, each of the correlation signals being frequency-converted M times with M carrier oscillating signals corresponding to the same satellite, each of the base signals being formed by removing a carrier wave from one of the correlation signals;

integrating means for time-integrating each of the base signals generated by the frequency converters and obtaining N×M) integrating signals; and control means for controlling the pseudo-noise code generators according to the integrating signals obtained by the integrating means to make the code phase of each pseudo-noise code agree with that of one noise code peculiar to one of the satellites, controlling the local oscillators to make a particular oscillating frequency of a particular carrier oscillating signal corresponding to one satellite agree with a carrier frequency of one carrier wave of one correlation signal which is generated by one correlating element corresponding to the same satellite for each of the satellites, and detecting the satellite signal of each satellite from a particular integrating signal obtained by the integrating means which relates to a particular base signal generated with the particular carrier oscillating signal by one frequency converter.

5. A demodulator circuit according to claim 4, further comprising:

a selector switch for maintaining the connection of a particular frequency converter selected from M frequency converters corresponding to a particular satellite of which a satellite signal is detected by the integrating means to a particular correlation element corresponding to the particular satellite to track the satellite signal of the particular satellite and connecting the other (M−1) frequency converters corresponding to the particular satellite to one or more correlation elements corresponding to one or more satellites other than the particular satellite to operate the other (M−1) frequency converters and (M−1) local oscillators connected to the other (M−1) frequency converters for the detection of the satellite signals of the satellites other than the particular satellite.

6. A demodulator circuit according to claim 4, further comprising:

filtering means for filtering the correlation signals generated by the correlation elements to reduce an intensity of a correlation signal in case where the correlation indicated by the correlation signal is weak, the correlation signals filtered being frequency-converted by the frequency converters.

7. A demodulator circuit according to claim 4, further comprising:

an antenna for receiving the radio waves transferred from the satellites, the radio waves received being converted into the correlation signals in the correlating elements;

measured position calculating means for calculating a position of the antenna from the satellite signals detected by the control means; and outputting means for outputting the position of the antenna calculated by the measured position calculating means.

8. A demodulator circuit in a global positioning system, comprising:

N pseudo-noise code generators for respectively generating a pseudo-noise code of which a code phase agrees with that of a noise code peculiar to one of N satellites every first sampling period, the pseudo-noise code generators relating to the satellites in one-to-one correspondence;

N correlating elements for generating N correlation signals in parallel respectively indicating a correlation between one of radio waves transferred from the satellites and one of the pseudo-noise codes generated by the pseudo-noise code generators every first sampling period to remove the noise codes from the radio waves, the correlating elements relating to the satellites in one-to-one correspondence, each of the radio waves being formed of one noise code, a satellite signal and a carrier wave modulated with the noise code and the satellite signal, and each of the correlation signals being formed of a satellite signal and a carrier wave-modulated with the satellite signal;

serial-parallel converting means for converting the N correlation signals generated in parallel by the correlating elements into the N correlation signals arranged in series to output the N correlation signals in series;

oscillating signal generating means for generating one of M carrier oscillating signals corresponding to each of the N satellites one after another every second sampling period for each or the satellites, M oscillating frequencies of the M carrier oscillating signals corresponding to a satellite being close to a carrier frequency of a carrier wave of one correlation signal which is generated by one correlating element corresponding to the same satellite, and the first sampling period being (N×M) times as long as the second sampling period;

frequency converting means for frequency-converting one of the correlation signals output from the serial-parallel converting means in series with one of the carrier oscillating signals generated by the oscillating signal generating means every second sampling period to generate (N×M) base signals every first sampling period, each of the correlation signals being frequency-converted M times with M carrier oscillating signals corresponding to the same satellite, each of the base signals being formed by removing a carrier wave from one of the correlation signals;

control means for controlling the oscillating signal generating means to make one of the oscillating frequencies of the M carrier oscillating signals corresponding to each of the N satellites agree with a carrier frequency of a carrier wave of one correlation signal which is generated by one correlating element corresponding to the same satellite; and integrating means for time-integrating each of the base signals generated by the frequency converters to detect the satellite signals of the N satellites from N base signals generated with N carrier oscillating signals of which N oscillating frequencies agree with the N carrier frequencies of the N carrier waves of the N correlation signals under the control of the control means.

9. A demodulator circuit according to claim 8 in which the oscillating signal generating means comprises:

phase storing means for storing N types of fundamental phases corresponding to the N satellites;

oscillating signal generating means for generating N fundamental oscillating signals from the N types of fundamental phases stored in the phase storing means;

frequency difference generating means for generating M frequency differences; and phase changing means for changing each of the fundamental oscillating signals to M carrier oscillating signals having M different frequencies by adding the frequency differences to each of the fundamental oscillating signals.

10. A demodulator circuit according to claim 8, further comprising:

filtering means for filtering the correlation signals generated by the correlation elements to reduce an intensity of a correlation signal in case where the correlation indicated by the correlation signal is weak, the correlation signals filtered being frequency-converted by the frequency converting means.

11. A demodulator circuit according to claim 8, further comprising:

an antenna for receiving the radio waves transferred from the satellites, the radio waves received being converted into the correlation signals in the correlating elements:

measured position calculating means for calculating a position of the antenna from the satellite signals detected by the integrating means; and outputting means for outputting the position of the antenna calculated by the measured position calculating means.

12. In a global positioning system including a plurality of N satellites, where N is an integer greater than 1, a demodulator circuit comprising:

a plurality of N pseudo-noise code generators, each pseudo-noise code generator generating a respective pseudo-noise code having a code phase which agrees with a code phase of a respective noise code peculiar to a respectively corresponding satellite every sampling period;

a plurality of N correlation means, each respective correlation means generating a respective correlation signal indicating a correlation between a radio wave transferred from the respectively corresponding satellite and the respective pseudo-noise code generated by the respective pseudo-noise code generator every sampling period to remove the respective noise code from the radio wave, the radio wave being formed of the respective noise code, a respective satellite signal and a respective carrier wave modulated with the noise code and the respective satellite signal, and the respective correlation signal being formed of the respective satellite signal and the respective carrier wave modulated with the respective satellite signal;

a plurality of K×N local oscillators where K is an integer greater than 1, each local oscillator generating a carrier oscillating signal every sampling period, wherein a plurality of K local oscillators correspond to each respectively corresponding satellite and generate K carrier oscillating signals having K respective oscillating frequencies which are close to a carrier frequency of the respective carrier wave of the respective correlation signal generated by the respective correlation means;

control means for controlling the local oscillators to make one of the K respective oscillating frequencies agree with the respective carrier frequency of the respective carrier wave of the respective correlation signal;

a plurality of K×N frequency converters, wherein a plurality of K frequency converters are connected for respectively frequency-converting the respective correlation signal generated by the respective correlation means with the K carrier oscillating signals generated by the K local oscillators every sampling period to generate a plurality of K base signals in correspondence with each satellite, each of the base signals being formed by removing the respective carrier wave from the respective correlation signal; and a plurality of K×N integrating means, wherein K integrating means are configured for respectively time-integrating K respective base signals generated by respective frequency converters to detect the respective satellite signal of the corresponding satellite from a corresponding one of said base signals generated with a corresponding carrier oscillating signal having an oscillating frequency which agrees with the respective carrier frequency of the respective carrier wave of the respective correlation signal under the control of the control means.

* * * * *